US012759280B2

(12) United States Patent
Kim

(10) Patent No.: US 12,759,280 B2
(45) Date of Patent: Oct. 13, 2026

(54) LAMINATION METHOD AND LAMINATION DEVICE PERFORMING THE SAME

(71) Applicant: Samsung Display Co., LTD., Yongin-si (KR)

(72) Inventor: Daehoi Kim, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 49 days.

(21) Appl. No.: 19/043,704

(22) Filed: Feb. 3, 2025

(65) Prior Publication Data

US 2025/0353290 A1 Nov. 20, 2025

(30) Foreign Application Priority Data

May 17, 2024 (KR) ........................ 10-2024-0064820

(51) Int. Cl.
*B32B 41/00* (2006.01)
*B32B 37/10* (2006.01)
*B32B 41/02* (2006.01)

(52) U.S. Cl.
CPC .......... *B32B 41/02* (2013.01); *B32B 37/1054* (2013.01); *B32B 2041/04* (2013.01); *B32B 2307/546* (2013.01); *B32B 2307/7376* (2023.05); *B32B 2457/20* (2013.01)

(58) Field of Classification Search
CPC . B32B 41/02; B32B 37/1054; B32B 2041/04; B32B 2307/546; B32B 2307/7376; B32B 2457/20; B32B 37/0046; B32B 37/10; B32B 41/00; B32B 37/003
USPC .................... 156/60, 64, 350, 351, 378, 379
See application file for complete search history.

(56) References Cited

U.S. PATENT DOCUMENTS

2017/0259313 A1* 9/2017 Fairlie ..................... B21B 37/28

FOREIGN PATENT DOCUMENTS

| | | | |
|---|---|---|---|
| KR | 100542426 | B1 | 1/2006 |
| KR | 1020150017669 | A | 2/2015 |
| KR | 1020190122736 | A | 10/2019 |

* cited by examiner

*Primary Examiner* — Michael N Orlando
*Assistant Examiner* — Joshel Rivera
(74) *Attorney, Agent, or Firm* — CANTOR COLBURN LLP

(57) ABSTRACT

A lamination method includes measuring a flatness of a first stage on which an object to be processed is placed, measuring an amount of sagging of an attachment roller which presses a film to attach the film to the object to be processed, primarily adjusting the flatness of the first stage based on the amount of sagging of the attachment roller, and secondarily adjusting the flatness of the first stage in a way such that a flatness of an end of the first stage relative to a center of the first stage has a smaller step than the first stage adjusted primarily.

19 Claims, 12 Drawing Sheets

LAMINATION METHOD AND LAMINATION DEVICE PERFORMING THE SAME

This application claims priority to Korean Patent Application No. 10-2024-0064820, filed on May 17, 2024, and all the benefits accruing therefrom under 35 U.S.C. § 119, the content of which in its entirety is herein incorporated by reference.

BACKGROUND

1. Field

Embodiments relate to a lamination method. More specifically, embodiments relate to a lamination method for attaching a protective film to a display panel and a lamination device for performing the lamination method.

2. Description of the Related Art

With the development of information technology, the importance of display devices, which are the medium of connection between users and information, is being highlighted. As a result, the use of display devices such as liquid crystal display devices ("LCDs"), organic light emitting display devices ("OLEDs"), and plasma display devices ("PDPs") is increasing.

The display device may include a deposition film (e.g., a metal film, or the like) formed on a substrate, and a top protective film laminated on the deposition film. The top protective film may protect the deposition film in a follow-up process.

In a case where the display device includes the substrate with a flexible property, a manufacturing process may proceed and a carrier substrate may be removed while supported by the carrier substrate with a rigid property. In this case, a lower protective film may be laminated on a lower part of the display panel from which the carrier substrate was removed. The lower protective film may protect a lower surface of the display panel in the follow-up process.

A lamination device that performs a lamination process of attaching the protective film to the top and bottom of the display panel may include an attachment roller. The attachment roller may pressurize the film to allow the protective film to be attached to the display panel.

SUMMARY

Embodiments provide a lamination method that improves yield by preventing the occurrence of curl defects.

Other embodiments provide a lamination device that performs the lamination method.

A lamination method according to an embodiment includes measuring a flatness of a first stage on which an object to be processed is placed, measuring an amount of sagging of an attachment roller which presses a film to attach the film to the object to be processed, primarily adjusting the flatness of the first stage based on the amount of sagging of the attachment roller, and secondarily adjusting the flatness of the first stage in a way such that a flatness of an end of the first stage relative to a center of the first stage has a smaller step than the first stage adjusted primarily.

In an embodiment, a lamination area where the film is attached to the object to be processed may be defined in the first stage, and the secondarily adjusting the flatness of the first stage may include adjusting a flatness of the lamination area.

In an embodiment, the lamination method may further include obtaining pressure-sensitive data of the lamination area of the first stage before the secondarily adjusting the flatness, and the secondarily adjusting the flatness may include adjusting the flatness of the first stage in a way such that the pressure-sensitive data of the end of the first stage has a greater or equal value relative to the center of the first stage.

In an embodiment, the step may be adjusted to about 100 micrometers or less.

In an embodiment, the object to be processed may include a display panel.

In an embodiment, the display panel may include a substrate having flexible property.

In an embodiment, the display panel may include a deposition film on the substrate, and the film protects the deposition film.

In an embodiment, the attachment roller may be movable in a first direction, and the step may be defined as a difference between a highest level and a lowest level of the first stage in a second direction crossing the first direction.

In an embodiment, the lamination method may further include tilting a second stage on which the film is placed, and attaching the film to the object to be processed while the attachment roller moves in the first direction, after the secondarily adjusting the flatness of the first stage.

A lamination device according to an embodiment includes a first stage on which an object to be processed is placed, a first sensor which measures a flatness of the first stage, an attachment roller which presses a film to attach the film to the object to be processed, a second stage on which the film is placed, where the second stage is movable in a tilted position, a second sensor which measures an amount of sagging of the attachment roller, and a flatness adjusting unit which primarily adjusts the flatness of the first stage based on the amount of sagging of the attachment roller, and secondarily adjusts the flatness of the first stage in a way such that the flatness of an end of the first stage relative to a center of the first stage has a smaller step than the first stage adjusted primarily.

In an embodiment, the flatness adjusting unit may include an adjusting bolt connected to a lower part of the first stage, and the adjusting bolt may move up and down according to a rotating direction to adjust a level of the first stage.

In an embodiment, the first stage may include a metal.

In an embodiment, a lamination area where the film is attached to the object to be processed may be defined in the first stage, and the flatness adjusting unit may adjust the flatness of the lamination area.

In an embodiment, the lamination device may further include a pressure-sensitive paper which obtains pressure-sensitive data of the lamination area of the first stage, and the flatness of the first stage may be adjusted in a way such that the pressure-sensitive data of the end of the first stage has a greater or equal value relative to the center of the first stage.

In an embodiment, the step may be adjusted to about 100 micrometers or less.

In an embodiment, the object to be processed may include a display panel.

In an embodiment, the display panel may include a substrate having flexible property.

In an embodiment, the display panel may include a deposition film on the substrate, and the film may protect the deposition film.

In an embodiment, the attachment roller may be movable in a first direction, and the step may be defined as a difference between a highest level and a lowest level of the first stage in a second direction crossing the first direction.

The lamination method and the lamination device performing the lamination method according to embodiments may measure the flatness of the first stage on which the object to be processed is placed, measure the amount of sagging of the attachment roller that presses the film to attach the film to the object to be processed, primarily adjust the flatness of the first stage based on the amount of sagging of the attachment roller, and secondarily adjust the flatness of the first stage in a way such that the flatness of the end of the first stage relative to the center of the first stage step than the first stage adjusted primarily.

The lamination device according to an embodiment of the disclosure may alleviate stress caused by a curl defect and improve a yield by deforming a shape of the first stage (i.e., a shape of a pressured contact surface) to compensate the sagging of the attachment roller AR (i.e., decompression deviation) without changing a structure of a facility.

In addition, an additional cost due to changes in the attachment roller may be reduced, and a process condition might not be changed due to changes in the attachment roller.

BRIEF DESCRIPTION OF THE DRAWINGS

The above and other features of embodiments of the disclosure will become more apparent by describing in further detail embodiments thereof with reference to the accompanying drawings, in which.

DETAILED DESCRIPTION

Figure 1:
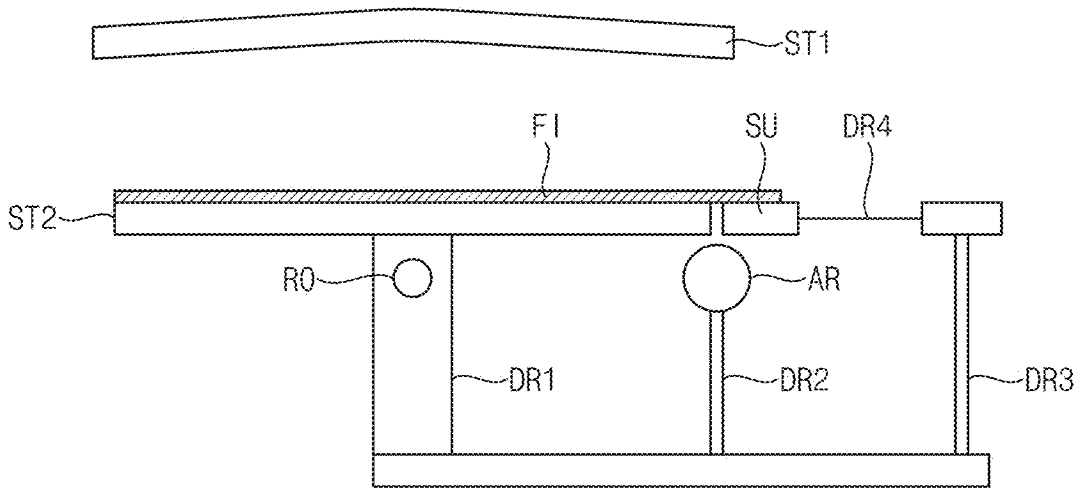
FIG. 1 is a view illustrating a lamination device according to an embodiment of the disclosure.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. Thus, reference to "an" element in a claim followed by reference to "the" element is inclusive of one element and a plurality of the elements. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the disclosure will be described in detail with reference to the accompanying drawings. The same reference numerals are used for the same components in the drawings, and any repetitive detailed descriptions of the same components will be omitted or simplified.

FIG. 1 is a view illustrating a lamination device according to an embodiment of the disclosure.

Referring to FIG. 1, a lamination device 1 according to an embodiment of the disclosure may include a first stage ST1, a second stage ST2, a first drive device DR1 including a rotary device RO, an attachment roller AR, a second drive device DR2, a supporter SU, a third drive device DR3, and a fourth drive device DR4.

In an embodiment, an object to be processed may be placed (or disposed) on the first stage ST1, and a film FI may be placed (or disposed) on the second stage ST2.

In an embodiment, for example, the object to be processed may be in a state of a mother substrate before separation. The film may be a protective film attached to the mother substrate.

In an embodiment, for example, the lamination device 1 may be a device to form a light-emitting device on the mother substrate and to attach the protective film protecting the light-emitting device.

In another embodiment, for example, the lamination device 1 may be a device for attaching the protective film on a lower part of the mother substrate before the separation the mother substrate into cells.

In an embodiment, the second stage ST2 may be tilted (or moved in a tilted position). In an embodiment, for example, the second stage ST2 may be connected to the first drive device DR1 including the rotary device RO.

In an embodiment, the attachment roller AR may pressurize the film FI in a way such that the film FI is attached to the object to be processed. In an embodiment, the attachment roller AR may move in a first direction. In an embodiment, the attachment roller AR may be connected to the second drive device DR2. The second drive device DR2 may be a lifting device. In an embodiment, for example, the lifting device may move in a second direction crossing the first direction.

In an embodiment, for example, the supporter SU may support an end portion of the film FI. In an embodiment, for example, the film FI, from which a liner is removed, may be placed on the second stage ST2. The liner may mean a film to protect an adhesive surface of the film FI. The film FI, from which the liner is removed, may have flexible property. If the end portion of the film FI is not supported, the end may be sagging, and an attachment error may occur.

In an embodiment, for example, the supporter SU may be connected to the third drive device DR3 and the fourth drive device DR4. In an embodiment, for example, the third drive device DR3 may be a lifting device, and the fourth drive device DR4 may be a device that adjusts a length or position of the supporter SU in a horizontal direction. However, the disclosure is not limited thereto.

It would be understood that the lamination device 1 shown in FIG. 1 is merely illustrative, and the lamination device 1 according to an embodiment of the disclosure may include additional various components for attaching the film FI to the object to be processed, or some of the components may be omitted.

Figure 3:
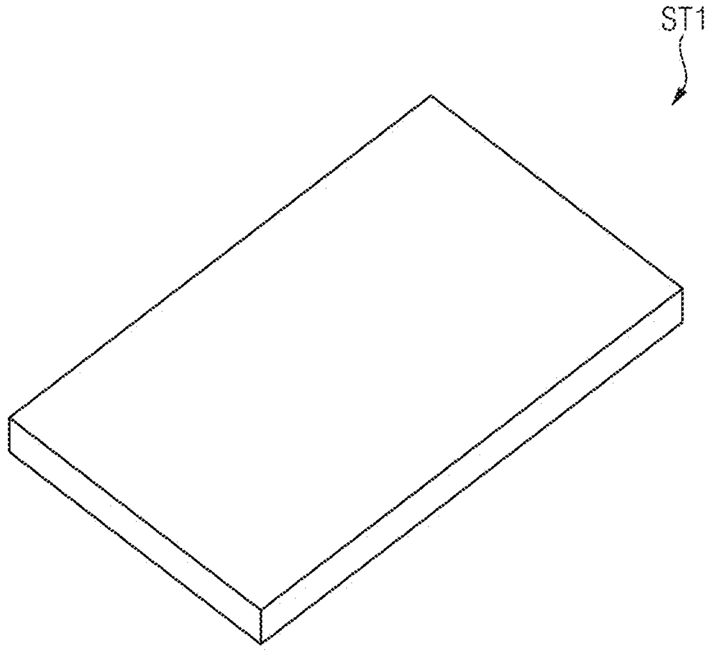
FIGS. 3, 4, and 5 are views illustrating the first stage included in the lamination device of FIG. 1.
Figure 4:
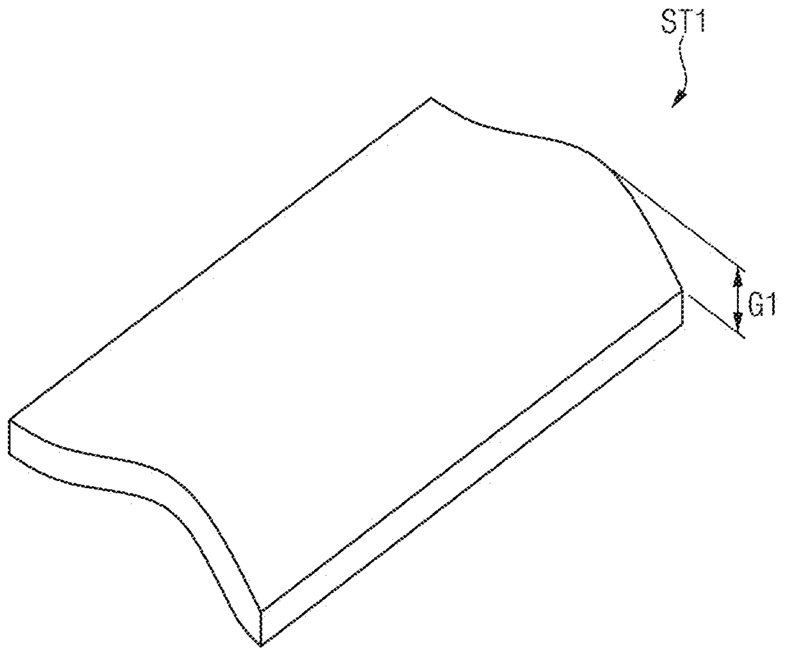
Figure 5:
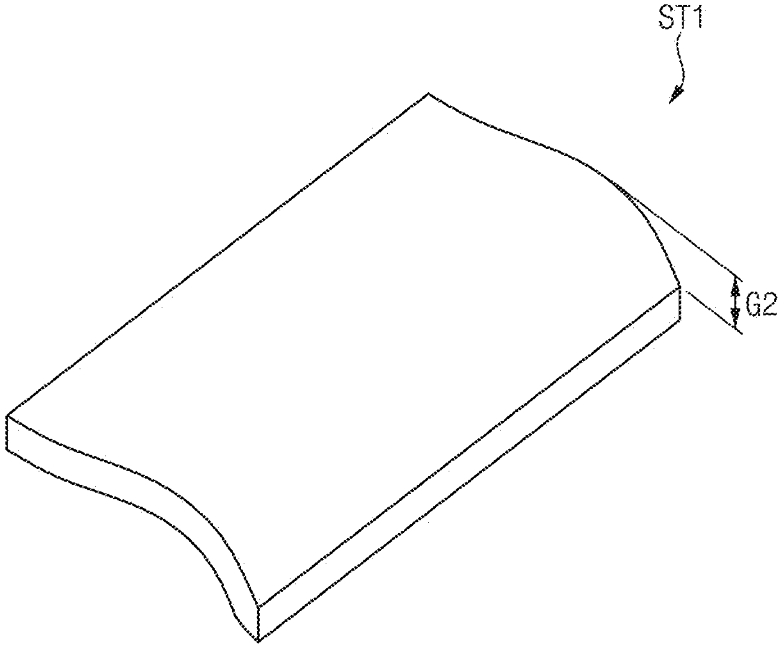
Figure 6:
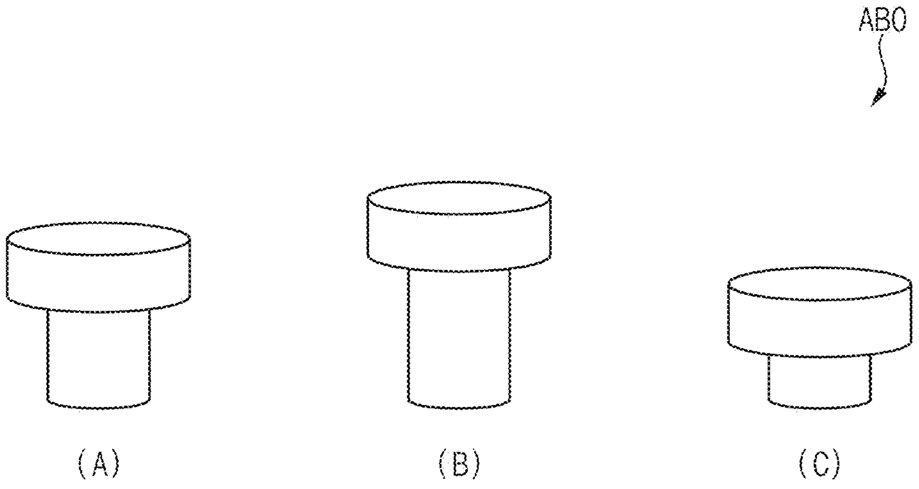
FIGS. 6(A), 6(B), and 6(C) are views illustrating the flatness adjustment unit according to an embodiment included in the lamination device of FIG. 1.

In an embodiment, the lamination device 1 may further include a first sensor (e.g., the first sensor SE1 of FIG. 8), a second sensor (e.g., the second sensor SE2 of FIG. 9), and a flatness adjustment unit (e.g., see FIGS. 3, 4, and 5).

In an embodiment, the first sensor may measure a flatness of the first stage ST1, and the second sensor may measure an amount of sagging of the second stage ST2.

In an embodiment, the flatness adjustment unit may primarily adjust the flatness of the first stage ST1 in response to the amount of sagging of the attachment roller AR. Next, the flatness of the first stage ST1 may secondarily adjust in a way such that the flatness of an end portion of the first stage ST1 relative to a center of the first stage ST1 has a smaller step than the first stage ST1 that is adjusted primarily.

In an embodiment, the step may mean a difference between a highest level and a lowest level of the first stage in the second direction crossing the first direction.

Detailed features of the flatness adjustment will be described below with reference to FIGS. 3, 4, 5, and 6.

Figure 2:
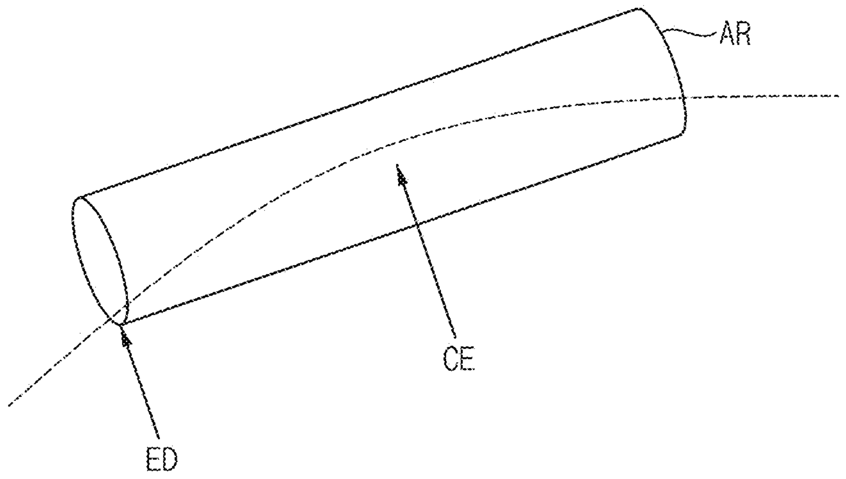
FIG. 2 is a view illustrating the attachment roller of FIG. 1.

FIG. 2 is a view illustrating the attachment roller AR of FIG. 1.

Referring to FIG. 2, an embodiment of the attachment roller AR may include a central portion CE and an edge portion ED extending symmetrically from the central portion CE.

In an embodiment, for example, the attachment roller AR may include a plurality of press cylinders. In such an embodiment, where the attachment roller AR includes the plurality of press cylinders, the attachment roller AR may have a weight of about several tens of kilogram (kg). In such an embodiment, the central portion CE may sag more than the edge portion ED when pressed due to the weight of the attachment roller AR. Accordingly, the central portion CE of the attachment roller AR may have a stronger pressing force than the edge portion ED.

In a conventional lamination device, the pressing force may be adjusted according to a position of the attachment roller. For example, the pressing force provided by each press cylinder in such a conventional lamination device may be adjusted differently. In this case, the sagging of about 0.13 millimeter (mm) may occur.

In another conventional lamination device, an additional cylinder (an additional cylinder at the edge portion ED) may be placed on the attachment roller. In this case, the amount of sagging was reduced to about 0.0017 mm, but as the additional cylinder is placed, a process conditions may be changed, and a cost of modification may increase.

The lamination device according to an embodiment of the disclosure may alleviate stress caused by a curl defect and improve a yield by deforming a shape of the first stage (i.e., a shape of a pressured contact surface) to compensate the sagging of the attachment roller AR (i.e., decompression deviation) without deforming a structure of a facility.

In such an embodiment, the sagging of the attachment roller AR may be compensated by changing the shape of the first stage (i.e., the shape of the pressured contact surface) without changing the structure of the facility. Accordingly, the additional cost due to changes in the attachment roller AR may be reduced, and the process condition may not be changed due to changes in the attachment roller AR.

FIGS. 3, 4, and 5 are views illustrating the first stage included in the lamination device of FIG. 1. FIGS. 6(A), 6(B), and 6(C) are views illustrating the flatness adjustment unit according to an embodiment included in the lamination device of FIG. 1.

Particularly, FIG. 3 shows an initial state of the first stage ST1. FIG. 4 shows a first deformation state of the first stage ST1. FIG. 5 shows a second deformation state of the first stage ST1.

Referring to FIGS. 2, 3, and 4, in an embodiment, the first stage ST1 may be deformed based on (e.g., in response to or in an amount corresponding to) the amount of sagging of the attachment roller AR.

In an embodiment, for example, the central portion CE of the attachment roller AR may sag more than the edge portion ED. Accordingly, the central portion CE of the attachment roller AR may have the stronger pressing force than the edge portion ED.

To compensate for this, unidirectional shape of the first stage ST1 may be deformed. In an embodiment, for example, as depicted in FIG. 3, the first stage ST1 may have a rectangular shape with a short side and a long side. In an embodiment, for example, the short side may be about 900 mm, and the long side may be about 1500 mm. However, the disclosure is not limited thereto. In embodiments, The shape, size, or the like, of the first stage ST1 may be variously changed.

In an embodiment, for example, a level of the first stage ST1 in contact with the central portion CE of the attachment roller AR and a level of the first stage ST1 in contact with the edge portion ED of the attachment roller AR may be adjusted differently. In an embodiment, for example, the level of the first stage ST1 in contact with the central portion CE of the attachment roller AR may be adjusted to be greater than the level of the first stage ST1 in contact with the edge portion ED of the attachment roller AR.

Referring to FIGS. 4 and 5, the first stage ST1 may be deformed in a way such that the step is reduced relative to whole surface of the first stage ST1. In an embodiment, the step may mean a difference between a highest level and a lowest level of the first stage ST1, e.g., a surface thereof, in a second direction crossing the first direction. The first stage ST1 may be deformed again to have a second gap G2 that is smaller than a first gap G1. The first gap G1 means the difference between the highest and lowest levels of the first stage ST1 in the first deformation state. The second gap G2 means the difference between the highest and lowest levels of the first stage ST1 in the second deformation state.

For example, if the step is large in a direction of lamination, the curl defect may occur by the step. In an embodiment, the flatness of the first stage ST1 may be adjusted secondarily in a direction in which the step is reduced to prevent the occurrence of the curl defect by the step.

TABLE 1

| short side | flatness data of the first stage averaged row by row | | | | | |
|---|---|---|---|---|---|---|
| −450 | 25 | 35 | 24 | 36 | 7 | 14 |
| −225 | 2 | 1 | −18 | −24 | 11 | 2 |
| 0 | −26 | −26 | −51 | −54 | −45 | −12 |
| 225 | 6 | 17 | −34 | −37 | −6 | −1 |
| 450 | 5 | 37 | 17 | 16 | 31 | 49 |

Table 1 shows a flatness measurement data by long/short side position of the first stage ST1. For example, the flatness measurement data was obtained from 30 measurement points. For example, if the short side is about 900 mm, the flatness measurement data were obtained at positions about −450, about −225, about 0, about +225, and about +450 on a basis of the center of the short side. The flatness measurement data may have a parabolic form that satisfies the following Equation 1.

$$Y = 2.6 * 10^{-10} X^2 \qquad \text{< Equation 1 >}$$

In Equation 1, Y denotes the flatness measurement data of the first stage averaged row by row, and X denotes the position of the measurement point.

Based on the flatness measurement data, an error range in the mathematical equation 1 may be about plus or minus 50%. For example, if the flatness measurement data is outside the error range, the flatness of the first stage ST1 may be readjusted.

However, Equation 1 and the error range described above are merely illustrative and may vary depending on a size of the short side of the first stage ST1, the number of measurement points, or the like.

Referring to FIGS. 2, 3, 4, 6(A), 6(B), and 6(C), in an embodiment, the first stage ST1 may include a metal. The flatness adjustment unit may include an adjusting bolt ABO connected to the lower part of the first stage ST1. In an embodiment, for example, the adjusting bolt ABO of FIG. 6(A) may increase in level as the adjusting bolt ABO rotates in one direction (see FIG. 6(B)), the level may decrease as the adjusting bolt ABO rotates in an opposite direction to the one direction (see FIG. 6(C)).

In an embodiment, the adjusting bolt ABO may rise and fall according to the rotation direction thereof to adjust the level of the first stage. In an embodiment, for example, the level of the adjusting bolt ABO in the center of the first stage ST1 (e.g., see FIG. 6(B)) may be greater than before the flatness adjustment. However, the disclosure is not limited thereto. The flatness of the first stage ST1 may be adjusted in various ways.

In an embodiment, a lamination area (e.g., a lamination area RE1 of FIG. 11), to which the film is attached to the object to be processed, may be defined in the first stage ST1, and the flatness adjustment unit may adjust the flatness of the first stage ST1.

In an embodiment, the lamination device may further include a pressure-sensitive paper that obtains pressure-sensitive data of the lamination area of the first stage, and the flatness of the first stage may be adjusted so that the pressure-sensitive data of the end of the first stage has a greater or equal value relative to the center of the first stage.

TABLE 2

| | | | | | |
|---|---|---|---|---|---|
| 1.00 | 1.00 | 1.06 | 0.90 | 0.92 | 1.03 |
| 0.93 | 1.00 | 1.11 | 0.83 | 0.95 | 0.97 |
| 0.95 | 1.00 | 1.14 | 0.93 | 0.95 | 0.97 |
| 1.00 | 1.00 | 1.00 | 1.00 | 1.00 | 1.00 |
| 1.00 | 1.05 | 1.09 | 0.95 | 0.95 | 0.97 |
| 0.98 | 1.08 | 1.17 | 0.88 | 0.97 | 1.00 |
| 0.98 | 1.05 | 1.20 | 0.85 | 1.00 | 1.06 |

TABLE 3

| | | | | | |
|---|---|---|---|---|---|
| 1.05 | 1.17 | 1.05 | 1.00 | 1.00 | 1.00 |
| 0.98 | 1.07 | 1.00 | 0.93 | 0.97 | 0.97 |
| 0.95 | 1.03 | 1.00 | 0.90 | 1.00 | 0.97 |
| 1.00 | 1.00 | 1.00 | 1.00 | 1.00 | 1.00 |
| 0.98 | 1.06 | 1.000 | 1.00 | 1.03 | 0.95 |
| 0.98 | 1.08 | 0.92 | 1.00 | 1.05 | 0.95 |
| 1.03 | 1.14 | 1.05 | 1.00 | 1.00 | 1.05 |

Table 2 and Table 3 show the pressure-sensitive data before and after the flatness of the first stage ST1 is adjusted. For example, Table 2 shows the pressure-sensitive data before the flatness is secondarily adjusted, and Table 3 shows the pressure-sensitive data after the flatness is secondarily adjusted.

For example, the amount of sagging of the roller AR in FIG. 2 may be about 0.13 mm.

For example, as shown in Table 2, in a case where the pressure-sensitive data of the center of the first stage ST1 is about 1.00, and the pressure-sensitive data of the end of the first stage ST1 is about 0.98, and about 1.00, the pressure-sensitive data caused by the sagging of the attachment roller AR in FIG. 2 may result in curl defect.

In this case, in an embodiment, the step may be adjusted to about 100 micrometers or less. In other words, in the first stage ST1 of FIG. 5, the difference between the highest and lowest levels may be about 100 micrometers or less.

For example, as shown in Table 3, in a case where the pressure-sensitive data of the center of the first stage ST1 is about 1.00, and the pressure-sensitive data of the end of the first stage ST1 is about 1.05, and the pressure-sensitive data is about 1.05, and about 1.03, the end is further pressurized based on (e.g., in response to or in an amount corresponding to) the sagging of the attachment roller, such that the occurrence of the curl defect may be effectively prevented.

For example, if the flatness is not adjusted (e.g., if the primary flatness adjustment corresponding to the sagging of the attachment roller and the secondary flatness adjustment in the direction of movement of the attachment roller), the curl defect may occur. If the curl defect occurs, problems may occur in a follow-up process. For example, a part where the curl defect occurred protrudes from the tray and is damaged during transportation, problems such as the part where the curl defect occurred are removed by the laser more may occur. As a result, yields may be reduced.

As shown in Table 3, the shape of the first stage ST1 may be deformed in a way such that the pressure-sensitive data of the end of the lamination area RE1 has a greater or equal value relative to the center of the lamination area RE1. Accordingly, the occurrence of the curl defect may be further prevented.

Figure 7:
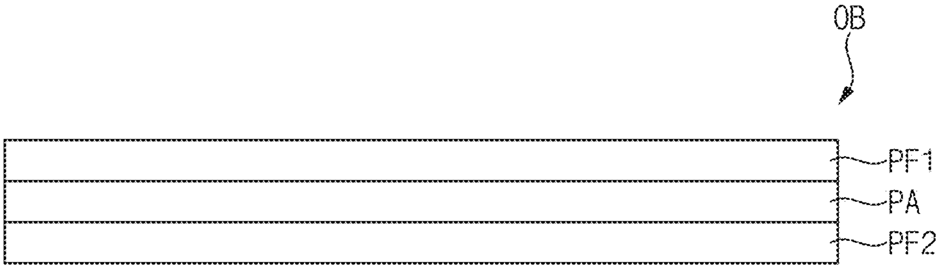
FIG. 7 is a view illustrating the object to be processed treated by the lamination device of FIG. 1.

FIG. 7 is a view illustrating the object to be processed treated by the lamination device of FIG. 1.

In an embodiment, the object to be processed may include a display panel PA. In an embodiment, for example, the lamination device 1 of FIG. 1 may attach protective films (e.g., a first protective film PF1 and/or a second protective film PF2) to an upper part and a lower part of the display panel PA.

In an embodiment, the display panel PA may include a substrate having a flexible property. In an embodiment, the display panel PA may include a deposition film on the substrate, and the film may protect the deposition film.

In an embodiment, for example, the lamination device 1 of FIG. 1 may be a device to form a light-emitting device on the substrate having the flexible property and to attach the first protective film PF1 to protect the light-emitting device.

In another embodiment, for example, the lamination device 1 of FIG. 1 may be a device for attaching the second protective film PF2 to the lower part of the substrate before separating the substrate into cells.

FIGS. 8, 9, 10, 11, 12, 13, 14, and 15 are views illustrating an embodiment of a lamination method using the lamination device of FIG. 1.

Hereinafter, for convenience of description, any repetitive detailed descriptions of the same or like elements as those of the lamination device described above with reference to FIGS. 1, 2, 3, 4, 5, 6, 7, and 8 will be omitted or simplified.

Figure 8:
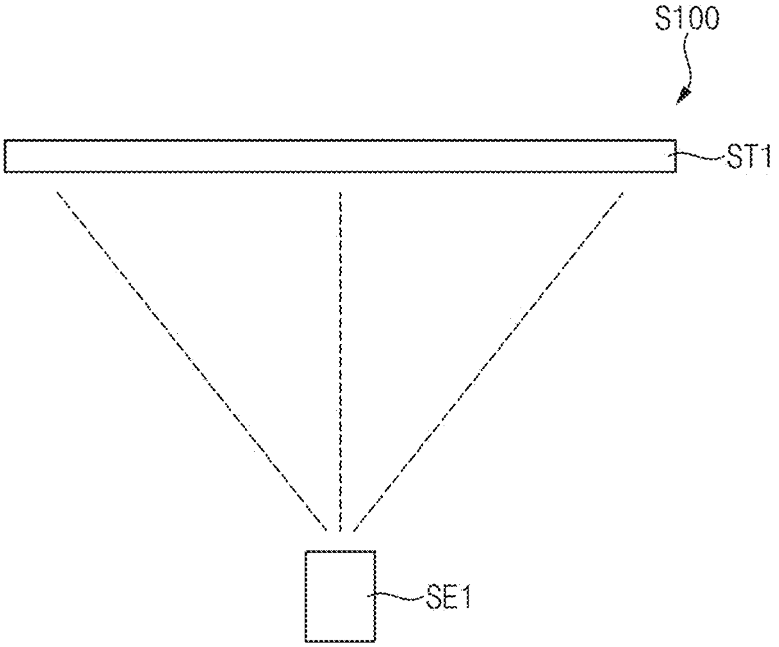
FIGS. 8, 9, 10, 11, 12, 13, 14, and 15 are views illustrating an embodiment of a lamination method using the lamination device of FIG. 1.

Referring to FIG. 8, in an embodiment, the flatness of the first stage ST1 on which the object to be processed is placed may be measured (S100).

In an embodiment, for example, a first sensor SE1 may be a three-dimensional laser sensor. In an embodiment, for example, by receiving and transmitting a beam from the first sensor SE1, the flatness of the first stage ST1 may be measured by converting a time between receiving and transmitting to a distance (e.g., see FIG. 16).

In an embodiment, the object to be processed may include the display panel. In an embodiment, the display panel may include the substrate having the flexible property. In an embodiment, the display panel may include the deposition film on the substrate, and the film may protect the deposition film.

As described above, in the case of the display panel having the flexible characteristics, a stress caused by the curl defect may appear in a process of being separated into the cells.

To prevent such a curl defect, the lamination method according to an embodiment of the disclosure may alleviate the stress by deforming the shape of the first stage ST1.

Figure 9:
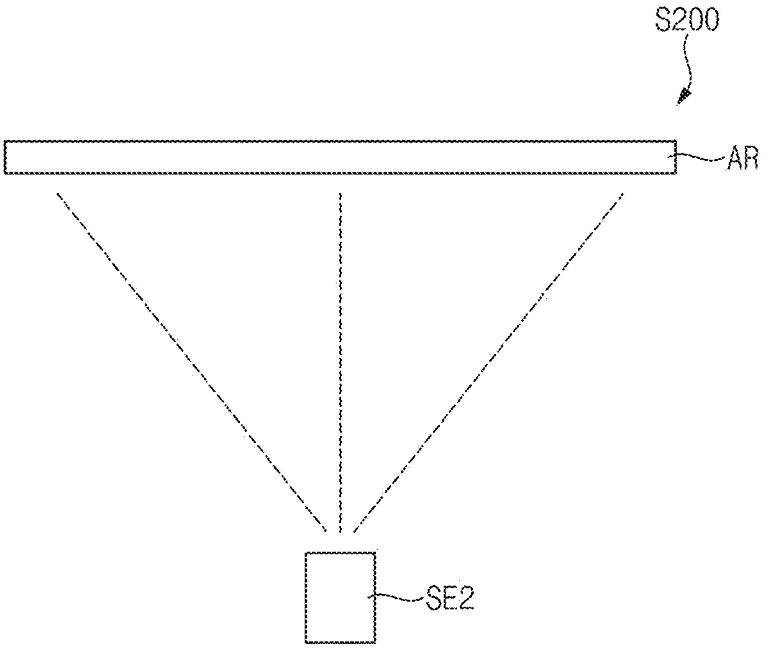

Referring to FIG. 9, in an embodiment, the amount of sagging of the attachment roller AR that presses the film to attach the film to the object to be processed may be measured (S200).

In an embodiment, for example, the second sensor SE2 may be a sagging analysis device. As described above, the attachment roller AR may sag at the end. The sagging of the end relative to the central portion may be analyzed through structural analysis.

For example, a maximum amount of sagging of the attachment roller AR may be calculated by the following Equation 2.

$$\delta_{max} = \frac{5\,wl^4}{384\,EI} \qquad \text{< Equation 2 >}$$

In Equation 2, w denotes a pressure per length (N/m) and l denotes a length of the long side.

Figure 10:
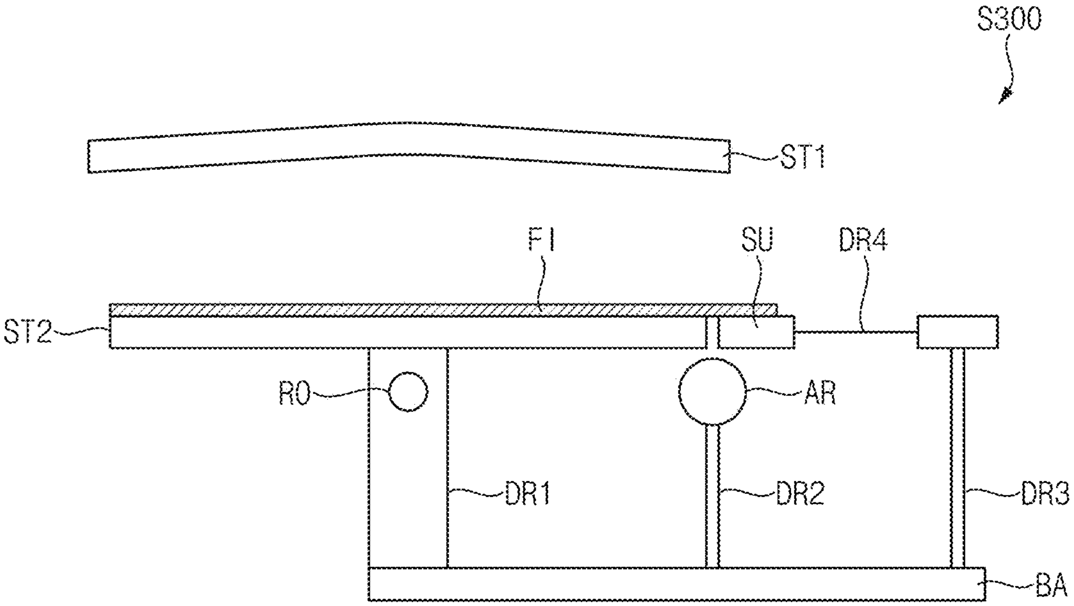

Referring to FIG. 10, the flatness of the first stage ST1 may be primarily adjusted based on or in response to the amount of sagging of the attachment roller AR (S300).

Figure 11:
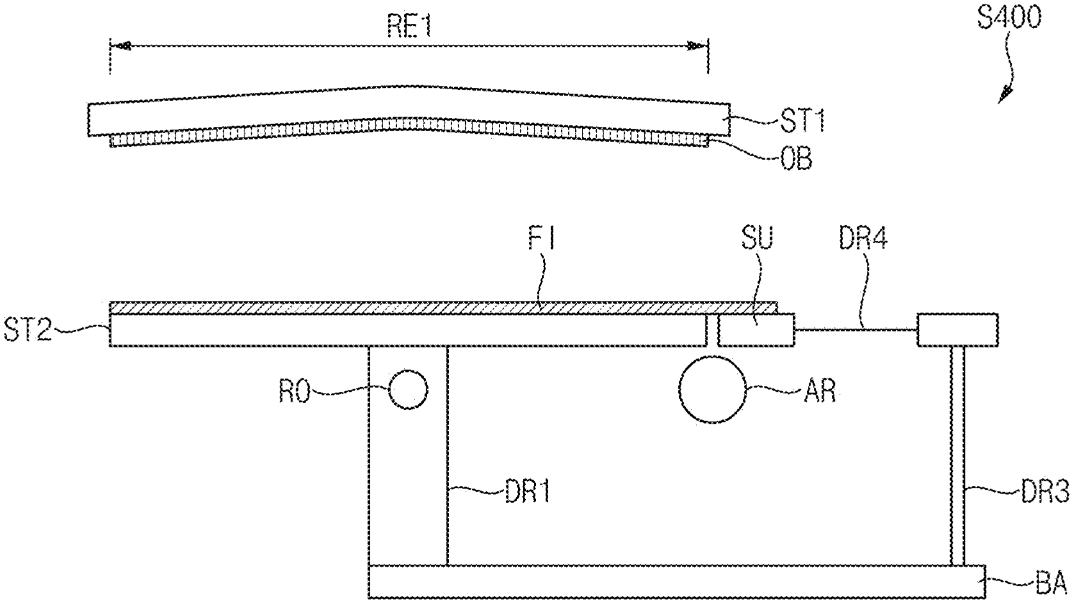

Referring to Table 2, Table 3, and FIG. 11, in an embodiment, the lamination area RE1 may be defined in the first stage ST1. The lamination area RE1 may mean an area including an end point from a starting point where the film FI is attached to the object to be processed OB.

In an embodiment, the pressure-sensitive data of the lamination area RE1 of the first stage ST1 may be obtained.

In an embodiment, the flatness of the first stage ST1 may be secondarily adjusted, after obtaining the pressure-sensitive data (S400). In the secondary adjusting of the flatness, the flatness of the first stage may be adjusted in a way such that the pressure-sensitive data of the end of the first stage has a greater or equal value relative to the center of the first stage. In an embodiment, the step may be adjusted to about 100 micrometers or less.

Figure 12:
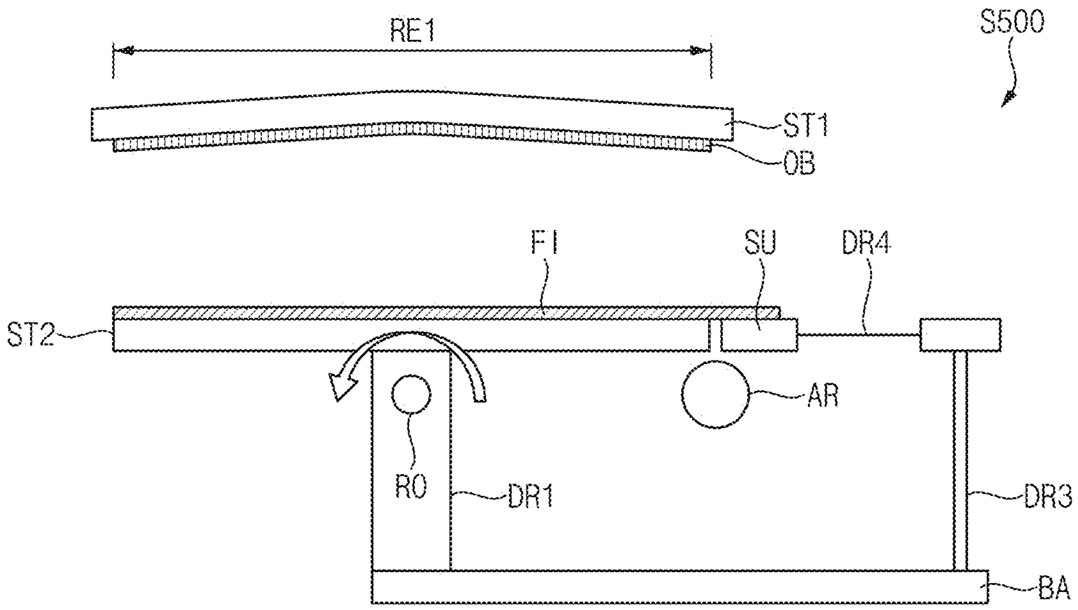

Referring to FIG. 12, in an embodiment, the second stage ST2 may be tilted (S600).

Figure 13:
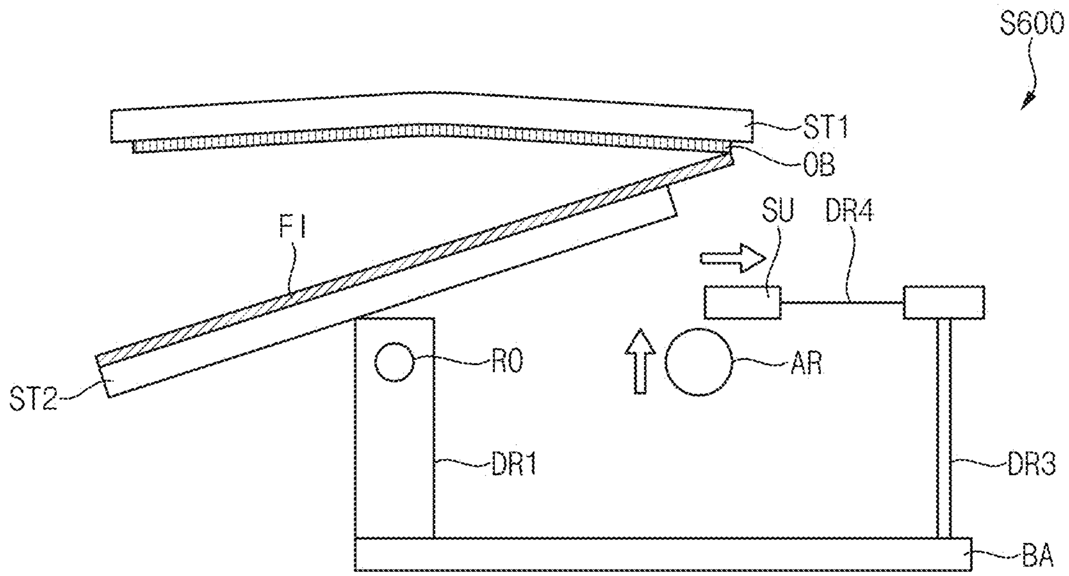

Referring to FIG. 13, the supporter SU may retreat to a position that does not interfere with the attachment roller AR. In an embodiment, the supporter SU may be connected to the length-adjustable fourth drive device DR4. In addition, the attachment roller AR may rise to a position where the attachment roller AR is in contact with the film FI. In an embodiment, the attachment roller AR may be connected to the lifting device (e.g., the second drive device DR2 of FIG. 10).

Figure 14:
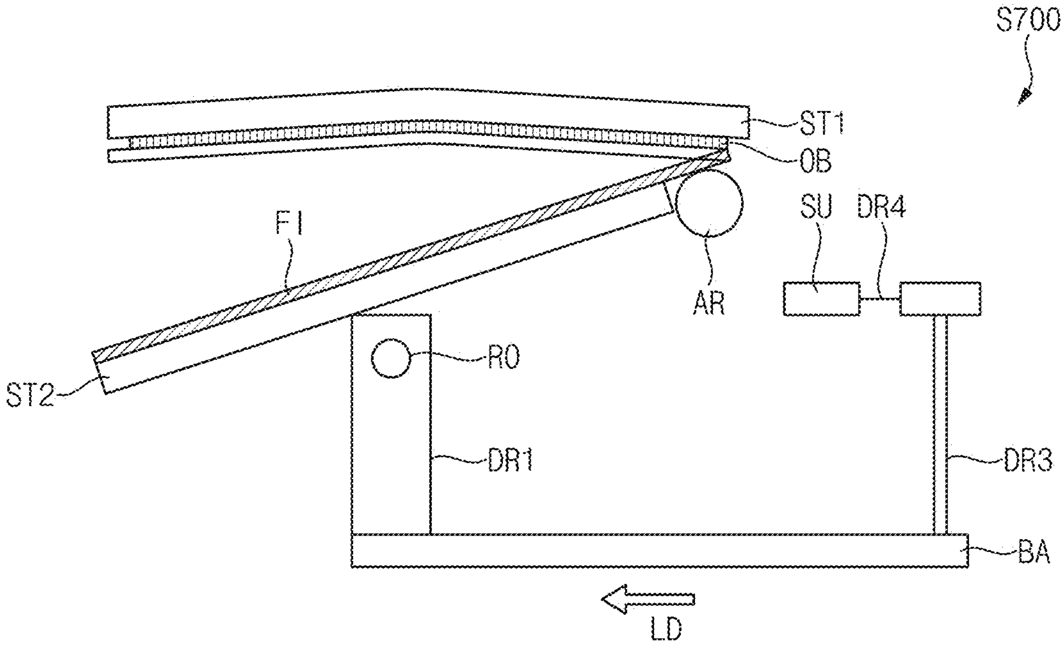
Figure 15:
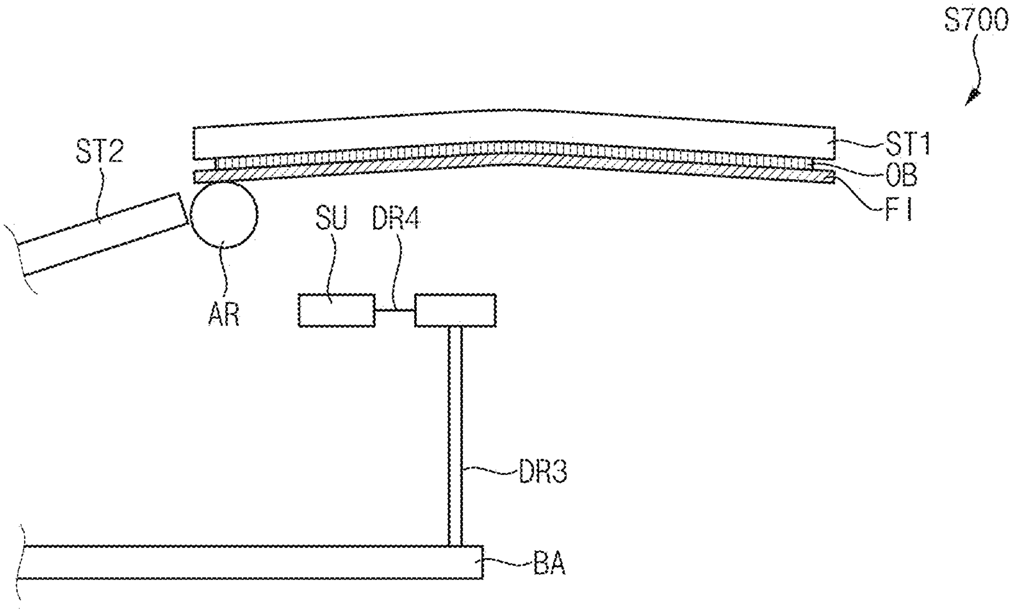

Referring to FIGS. 14 and 15, in an embodiment, the film FI may be attached to the object to be processed OB while the attachment roller AR moves in the first direction (S700).

In an embodiment, for example, as shown in FIGS. 14 and 15, the second stage ST2, the attachment roller AR, and the supporter SU are placed on a base BA, and that the second stage ST2, the attachment roller AR, and the supporter SU move in a traveling direction LD1 (e.g., the first direction) with the base BA, but the disclosure is not limited thereto. In another embodiment, for example, the lamination process may proceed while the first stage ST1 moves.

Figure 16:
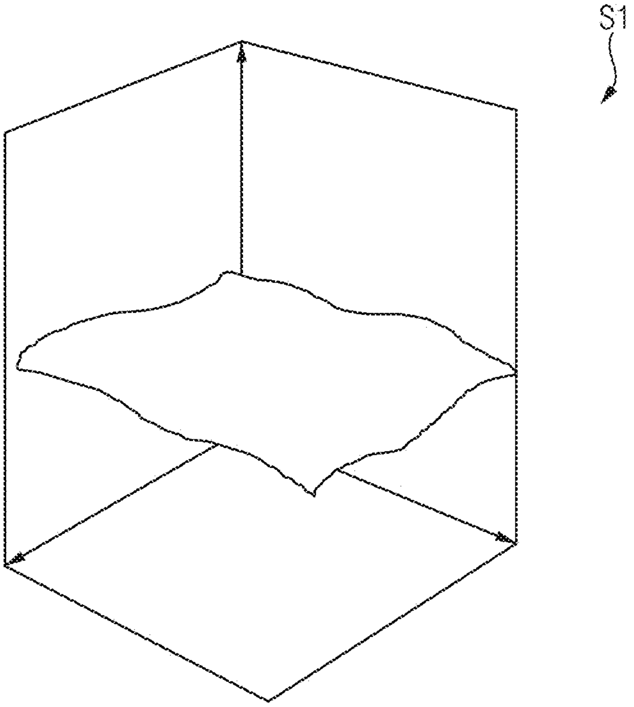
FIGS. 16, 17, and 18 are views illustrating the state (shape) of the first stage used in the lamination method of FIGS. 8, 9, 10, 11, 12, 13, 14, and 15.
Figure 17:
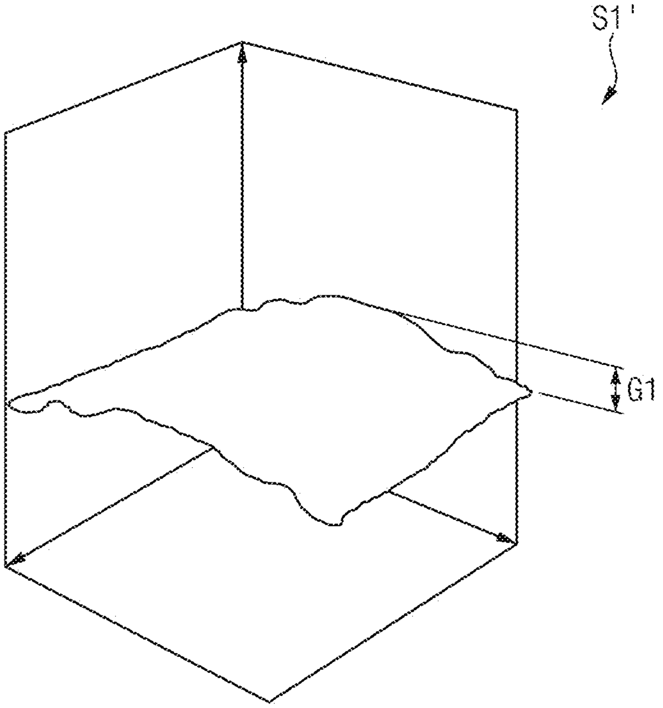
Figure 18:
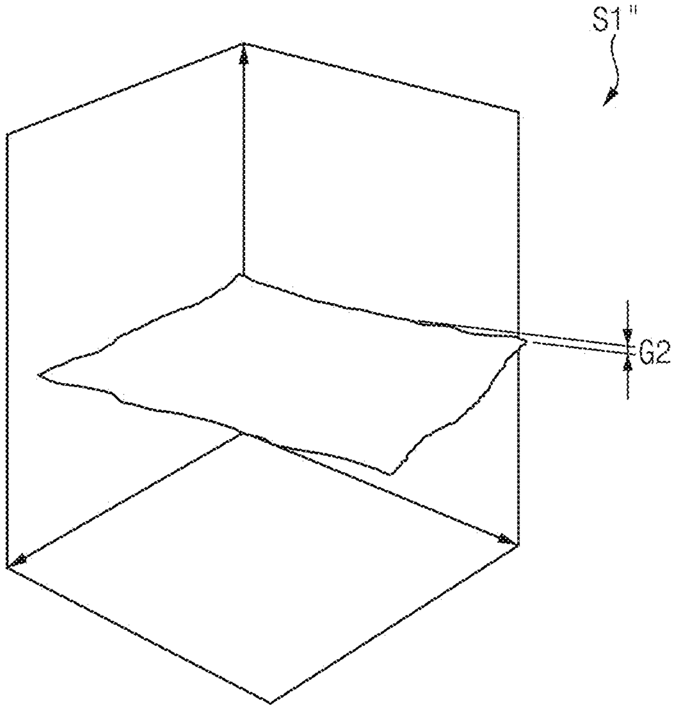

FIGS. 16, 17, and 18 are views illustrating the state (shape) of the first stage used in the lamination method of FIGS. 8, 9, 10, 11, 12, 13, 14, and 15.

Particularly, FIG. 16 shows an initial state S1 of the first stage ST1. FIG. 17 shows a first deformation state S1' of the first stage ST1. FIG. 18 shows a second deformation state S1" of the first stage ST1.

Referring to FIGS. 3, 4, 5, 16, 17, and 18, the first stage ST1 may have the first gap G1 in the first deformation state S1'. In addition, the first stage ST1 may have the second gap G2 in the second deformation state S1". In an embodiment, the step may mean the difference between the highest and lowest levels of the first stage in the second direction crossing the first direction. As described above, the first gap G1 means the difference between the highest and lowest levels of the first stage ST1 in the first deformation state. The second gap G2 means the difference between the highest and lowest levels of the first stage ST1 in the second deformation state.

For example, in a case of a lamination method and a lamination device performing the lamination method according to a comparative example, the shape of the first stage ST1 may not be deformed (e.g., the initial state S1 of the first stage ST1 of FIG. 16). In this case, the difference between the highest and lowest levels of the first stage ST1 may be about 369 micrometers. Accordingly, as a result of evaluation with the pressure-sensitive paper, a pressure loss phenomenon occurred in a side part of the first stage ST1, and a decompression deviation was about 10.53%.

However, in a case of a lamination method and a lamination device performing the lamination device according to an embodiment of the disclosure, the shape of the first stage ST1 may be deformed based on or in response to the amount of sagging of the attachment roller. The first gap G1 of the first stage ST1 may differ by about 96 micrometers. In addition, the first stage ST1 may reduce the decompression deviation to about 7.69% through step improvement. Accordingly, the occurrence of the curl defect may be reduced.

Figure 19:
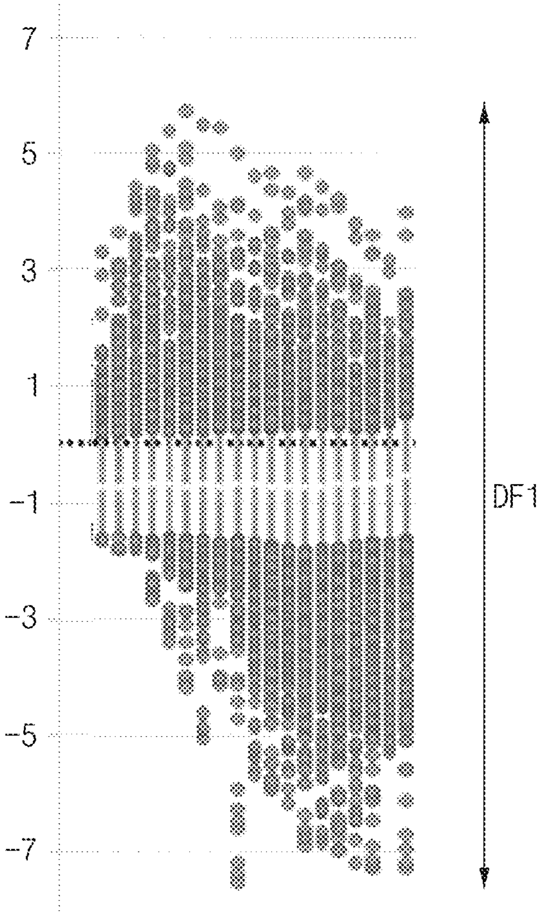
FIGS. 19 and 20 are views illustrating an effect of the lamination method and the lamination device performing the lamination method according to embodiments of the disclosure.
Figure 20:
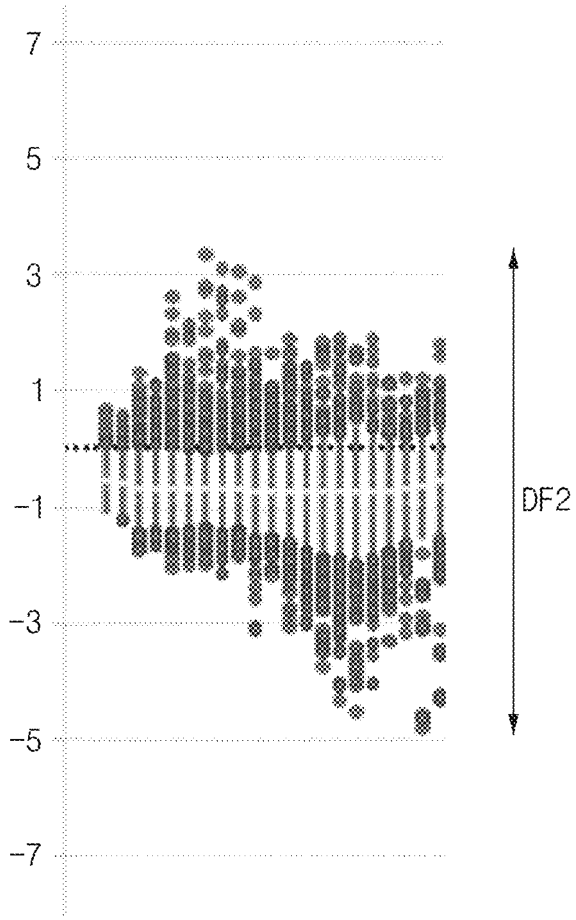

FIGS. 19 and 20 are views illustrating an effect of the lamination method and the lamination device performing the lamination method according to embodiments of the disclosure.

Particularly, FIG. 19 is a view summarizing a degree of curl of the display device manufactured by the lamination method and lamination device performing the lamination method according to the comparative example. FIG. 20 is a view summarizing the degree of curl of the display device manufactured by the lamination method and the lamination device performing the lamination method according to an embodiment of the disclosure.

For example, the degree of curl (Y-axis) may be measured by the curl measurement sensor. The curl sensor may set the center of the display device, where a bottom surface is flat, as a zero point and measure the degree of bending from the zero point. In a case, for example, where the display device has a rectangular shape, a height of the center of the rectangle may be measured, and the heights of four vertices may be measured. By comparing the heights, a presence of the curl that may be expressed in the display device (e.g., forward curl (+), reverse curl (−), twist curl (different heights in diagonal direction), or the like) may be confirmed.

For example, the degree of the curl may be expressed in a form of divergence in the direction of lamination. However, the disclosure is not limited thereto. For example, the degree of curl may be expressed in a form of convergence in the direction of lamination.

Referring to FIGS. 19 and 20, a probability of the curl appearing in the direction in which the lamination proceeds may increase. Accordingly, a defect rate due to the defective curl may increase.

However, the lamination method and the lamination device performing the lamination method according to an embodiment of the may deform the form of the first stage to reduce the occurrence of the curl defect by the amount of sagging of the attachment roller (the degree of divergence DF2 of FIG. 20 compared to the degree of divergence DF1 of FIG. 19 is reduced). Accordingly, the yield may increase.

The lamination device and the method in the embodiments may be applied to a display device included in a computer, a notebook, a mobile phone, a smartphone, a smart pad, a portable media player ("PMP"), a personal digital assistance ("PDA"), an MP3 player, or the like.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A lamination method comprising:
measuring a flatness of a first stage on which an object to be processed is placed;
measuring an amount of sagging of an attachment roller which presses a film to attach the film to the object to be processed;
primarily adjusting the flatness of the first stage based on the amount of sagging of the attachment roller; and
secondarily adjusting the flatness of the first stage in a way such that a flatness of an end of the first stage relative to a center of the first stage has a smaller step than the first stage adjusted primarily.

2. The lamination method of claim 1, wherein,
a lamination area where the film is attached to the object to be processed is defined in the first stage, and
the secondarily adjusting the flatness of the first stage comprises adjusting a flatness of the lamination area.

3. The lamination method of claim 2, further comprising:
obtaining pressure-sensitive data of the lamination area of the first stage before the secondarily adjusting the flatness, and
wherein the secondarily adjusting the flatness comprises adjusting the flatness of the first stage in a way such that the pressure-sensitive data of the end of the first stage has a greater or equal value relative to the center of the first stage.

4. The lamination method of claim 2, wherein the step is adjusted to be about 100 micrometers or less.

5. The lamination method of claim 1, wherein the object to be processed includes a display panel.

6. The lamination method of claim 5, wherein the display panel includes a substrate having flexible property.

7. The lamination method of claim 6, wherein the display panel includes a deposition film on the substrate, and the film protects the deposition film.

8. The lamination method of claim 1, wherein,
the attachment roller is movable in a first direction, and
the step is defined as a difference between a highest level and a lowest level of the first stage in a second direction crossing the first direction.

9. The lamination method of claim 8, further comprising:
tilting a second stage on which the film is placed; and
attaching the film to the object to be processed while the attachment roller moves in the first direction, after the secondarily adjusting the flatness of the first stage.

10. A lamination device comprising:
a first stage on which an object to be processed is placed;
a first sensor which measures a flatness of the first stage;
an attachment roller which presses a film to attach the film to the object to be processed;
a second stage on which the film is placed, wherein the second stage is movable in a tilted position;
a second sensor which measures an amount of sagging of the attachment roller; and
a flatness adjusting unit which primarily adjusts the flatness of the first stage based on the amount of sagging of the attachment roller, and secondarily adjusts the flatness of the first stage in a way such that the flatness of an end of the first stage relative to a center of the first stage has a smaller step than the first stage adjusted primarily.

11. The lamination device of claim 10,
wherein the flatness adjusting unit comprises an adjusting bolt connected to a lower part of the first stage, and
wherein the adjusting bolt moves up and down according to a rotating direction to adjust a level of the first stage.

12. The lamination device of claim 10, wherein the first stage includes a metal.

13. The lamination device of claim 10, wherein,
a lamination area where the film is attached to the object to be processed is defined in the first stage, and
the flatness adjusting unit adjusts the flatness of the lamination area.

14. The lamination device of claim 13, further comprising:
a pressure-sensitive paper which obtains pressure-sensitive data of the lamination area of the first stage, and
wherein the flatness of the first stage is adjusted in a way such that the pressure-sensitive data of the end of the first stage has a greater or equal value relative to the center of the first stage.

15. The lamination device of claim 10, wherein the step is adjusted to about 100 micrometers or less.

16. The lamination device of claim 10, the object to be processed includes a display panel.

17. The lamination device of claim 16, wherein the display panel includes a substrate having flexible property.

18. The lamination device of claim 17, wherein the display panel includes a deposition film on the substrate, and the film protects the deposition film.

19. The lamination device of claim 10,
wherein the attachment roller is movable in a first direction, and
the step is defined as a difference between a highest level and a lowest level of the first stage in a second direction crossing the first direction.

* * * * *